M. O. DOLSON.
HOSE PATCH.
APPLICATION FILED NOV. 2, 1915.
1,177,500. Patented Mar. 28, 1916.
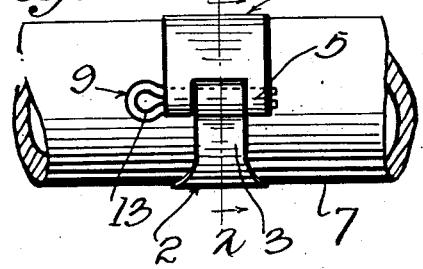
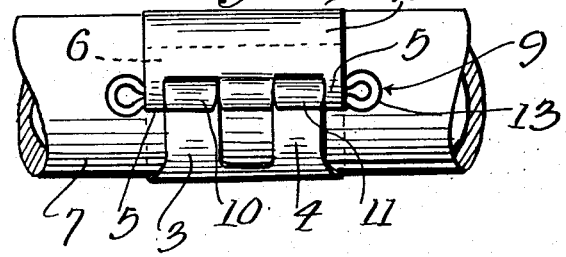
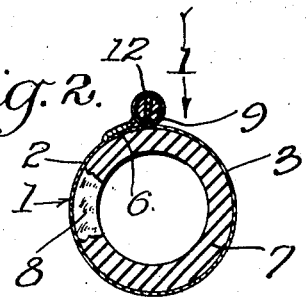
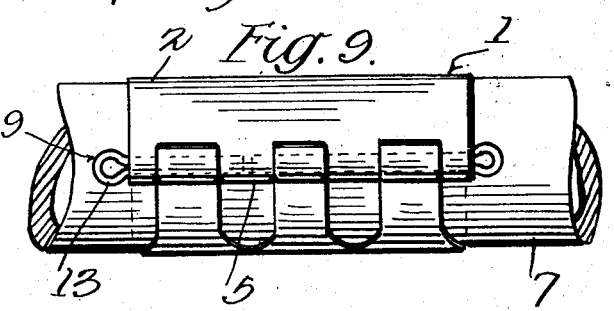
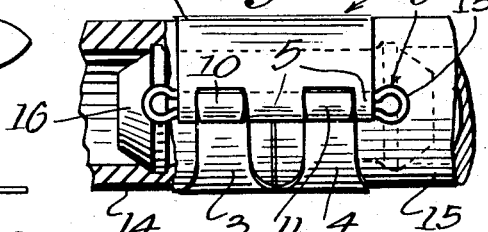
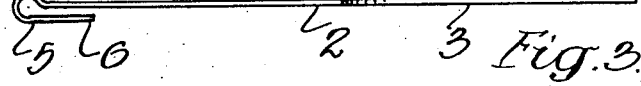
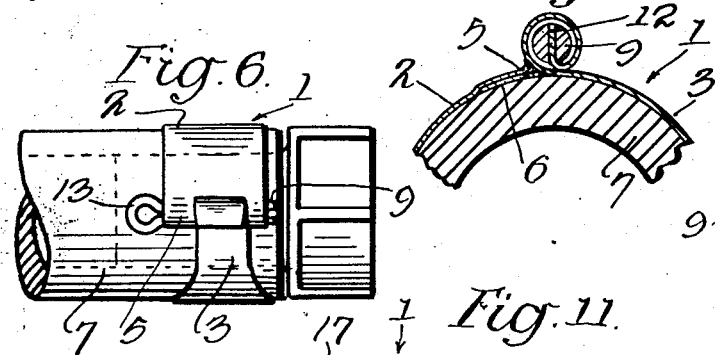
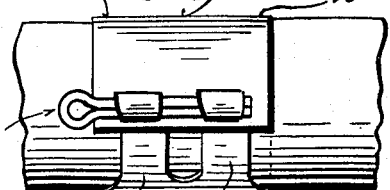
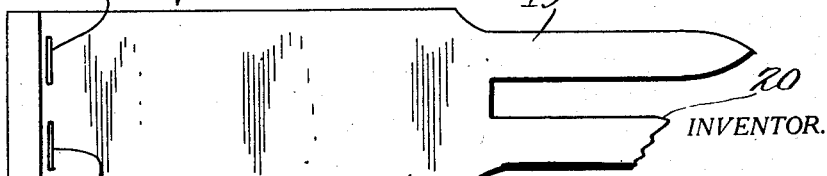
WITNESSES:
C. J. Williams
Edna M. Swift
INVENTOR.
BY Martin O. Dolson

UNITED STATES PATENT OFFICE.

MARTIN O. DOLSON, OF LOS ANGELES, CALIFORNIA.

HOSE-PATCH.

1,177,500.  Specification of Letters Patent.  Patented Mar. 28, 1916.

Application filed November 2, 1915. Serial No. 59,260.

*To all whom it may concern:*

Be it known that I, MARTIN O. DOLSON, a citizen of the United States, residing at Los Angeles, in the county of Los Angeles and State of California, have invented a new and useful Hose-Patch, of which the following is a specification.

The object of this invention is to provide a simple and efficient device which combines a hose patch and clamp; and my invention consists of the novel features herein shown, described and claimed.

An embodiment of my invention is shown in the accompanying drawings, in which—
Figure 1 is a fragmentary plan view of a piece of hose, showing my hose patch and clamp in place, as indicated by the arrow 1, in Fig. 2. Fig. 2 is a cross section on the line 2—2 of Fig. 1 showing the hose patch in place to cover a blow out. Fig. 3 is an enlarged fragmentary section of the retaining and tightening means as shown in Fig. 2. Fig. 4 is a plan view of the hose patch stamping as it appears before it is applied to the hose. Fig. 5 is an edge view of Fig. 4. Fig. 6 is a fragmentary plan view of a piece of hose, showing the device applied to hold a coupling in place in one end of hose. Fig. 7 is a fragmentary plan view of a piece of hose showing a modified form of hose patch which is wider and has two retaining tines instead of one. Fig. 8 is a view analogous to Fig. 7 showing the device in place to clamp two pieces of hose together, which are connected together by an inside coupling. Fig. 9 is a plan view showing still another form, which is wider than that shown in Figs. 7 and 8 and is provided with three retaining tines. Fig. 10 is a plan view of another form. Fig. 11 is a plan view of the stamping of the form shown in Fig. 10.

Referring more particularly to the drawings, a hose patch embodying the principles of my invention comprises a stamping 1 of thin sheet metal, adapted to encircle a hose and consisting of a body portion 2, which may be varied from one to three inches in width, having a series of outwardly extending tines 3 and 4. The outer end of the body portion 2 is notched out and bent around upon itself to form a series of loops or hinge members 5, as shown in Fig. 5. The bent over portion 6 of the body rests upon the periphery of the hose when the patch is in place and tends to reinforce the loops 5 when strain is applied to tighten the patch.

In applying the device to the hose 7 as in mending a blow-out 8, shown in Fig. 2, a cotter pin 9 is inserted through the loops 5 of the body portion 2, the outer ends 10 and 11 of the tines 3 and 4 are inserted in the slot 12 in the cotter pin 9, as shown in Figs. 2 and 3 and the pin 9 is rotated in the loops 5 until the band is drawn tightly around the hose. A nail or any other convenient object may be inserted in the eye 13 of the cotter pin 9 to facilitate the operation of tightening the device.

The inner edges of the slots formed in the bent over portion 6, of the body portion 2, bear against the tines 3 and 4 when said tines are wound upon the cotter pin 9, as shown in Fig. 3, so that said inner edges impinge against the tines and prevent the same from rotating to loosen the patch when the patch is in place upon the hose. The cotter pin 9 is rotated until the patch is drawn tightly in place around the hose which operation tends to draw the edges of the slots up tightly so that it is impossible for the portion 6 to slip past the tines and cotter pin to unroll the loops 5.

In Fig. 7 I have shown two cotter pins extending inwardly toward each other and meeting in the central loop or hinge member, but in the other views I have shown the single cotter pin.

Fig. 8 shows the device in place covering the abutting ends of two pieces of hose 14 and 15 held together by a coupling 16.

Figs. 10 and 11 show a modified form in which the body portion is provided with a pair of narrow slits 17 and 18 in line with the tines 19 and 20, so that when the device is bent around the hose the tines 19 and 20 may be inserted through the slits 17 and 18 and the cotter pin applied and tightened as in the others.

It is obvious from the foregoing that I have constructed a simple and efficient device which may be readily applied to any hose either as a patch or a clamp; and which may be tightened to any degree and adjusted from time to time as occasion requires.

What I claim, and desire to secure by Letters Patent of the United States, is—

A hose patch comprising a sheet metal band adapted to encircle a hose and having a body portion, one end of said body portion being bent upon itself and notched out to form loops, a bent over portion connecting said loops together, a tine formed upon the other end of said body portion and adapted to register with said loops, a cotter pin extending through said loops and engaging the outer end of said tine, so that when said cotter pin is rotated the band is drawn tightly around the hose and the inner edge of said notched out portion impinges against the tine to prevent it from unwinding.

MARTIN O. DOLSON.

Witnesses:
C. J. WILLIAMS,
JUSTINE OTTOFY.